United States Patent [19]

Grieb et al.

[11] Patent Number: 4,923,169

[45] Date of Patent: May 8, 1990

[54] MULTI-STREAM THIN EDGE ORIFICE DISKS FOR VALVES

[75] Inventors: John H. Grieb; J. Michael Joseph, both of Newport News; Richard D. Weaver, Williamsburg; George T. Bata, Grafton, all of Va.

[73] Assignee: Siemens-Bendix Automotive Electronics L.P., Troy, Mich.

[21] Appl. No.: 402,420

[22] Filed: Sep. 1, 1989

Related U.S. Application Data

[60] Division of Ser. No. 285,143, Dec. 16, 1988, which is a division of Ser. No. 137,497, Dec. 23, 1987, Pat. No. 4,854,024, which is a continuation-in-part of Ser. No. 937,658, Dec. 4, 1986, abandoned.

[51] Int. Cl.$^5$ .................... F16K 47/14; F16K 31/06; F02M 51/06
[52] U.S. Cl. .................... 251/118; 251/127; 239/552; 239/567; 239/585
[58] Field of Search ............... 251/118, 127; 239/552, 239/563, 567, 533.2, 533.3, 585

[56] References Cited

U.S. PATENT DOCUMENTS 4,423,842  1/1984  Palma ........................... 239/585
4,699,323  10/1987 Rush et al. .................... 239/552
4,771,984  9/1988  Szablewski ................... 239/585 X

FOREIGN PATENT DOCUMENTS 549823   5/1932  Fed. Rep. of Germany ... 239/533.3
1063432  8/1959  Fed. Rep. of Germany ...... 251/127

Primary Examiner—Arnold Rosenthal
Attorney, Agent, or Firm—George L. Boller; Russel C. Wells

[57] ABSTRACT

A dual stream thin edge orifice disk is defined as a disk having a pair of orifices positioned to direct the flow of fluid from the interior portion of a valve into two different streams. The dual streams may be parallel or typically diverge at an angle for directing the stream to two adjacent engine valves in the situation wherein the valve is an electromagnetic fuel injector for an internal combustion engine. To have the dual streams flow in a direction that is not parallel, the area of the disk surrounding the dual orifices is embossed and the orifices are positioned along the sides of the embossment between the base and the apex thereof. The manufacturing of the accurately sized orifices in the disk is accomplished by means of a progressive die. One of the stations of the die provides a coining operation on the orifice. Such coining operation is adjustable by means of a micrometer adjustment. Another of the stations provides a forming operation wherein an embossment is formed in such a manner that the orifices are positioned on the sides of the embossment between the base and the apex. In another embodiment of a valve, a pair of dual orifice disks are position adjacent each other with the orifices of the first disk overlapping the orifices of the second disk.

3 Claims, 2 Drawing Sheets

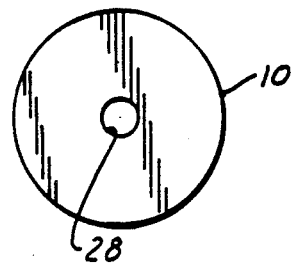
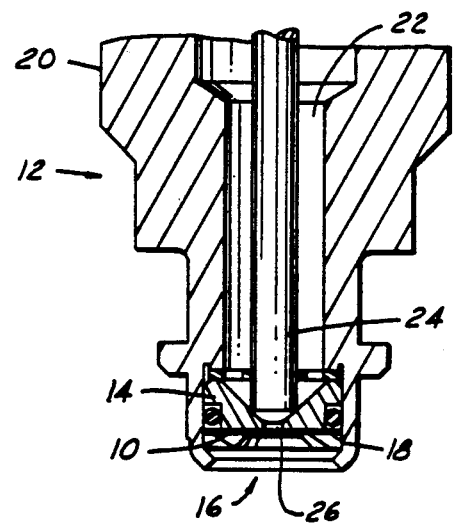
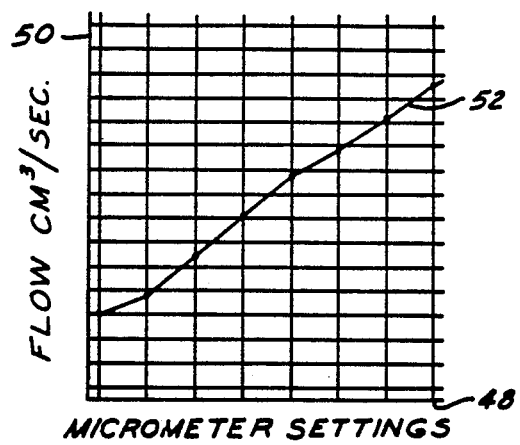
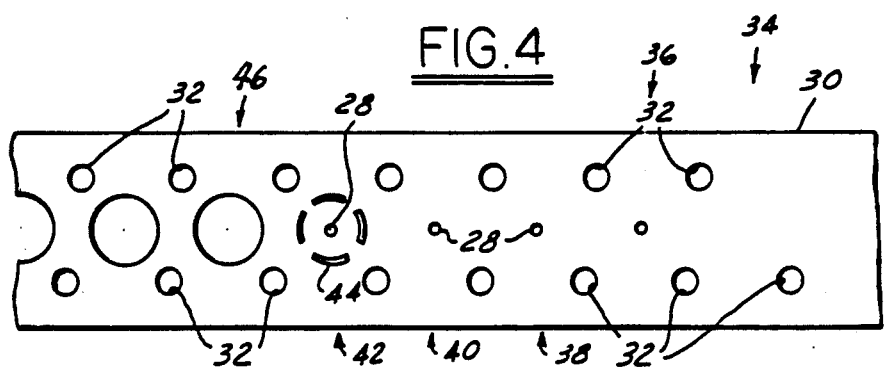

MULTI-STREAM THIN EDGE ORIFICE DISKS FOR VALVES

This is a divisional of copending application(s) Ser. No. 07/285,143 filed on 12/16/88; which is a divisional of Ser. No. 07/137,497 filed on 12/23/87 (U.S. Pat. No. 4,854,024 Issued 08/08/89); which is a continuation-in-part of Ser. No. 07/937,658 filed on 12/04/86 and abandoned on 12/23/87.

This invention relates to multi-stream thin edge orifices for disks for valves and more particularly to the manufacturing of thin disks having at least two thin edge orifices therein for use in fuel injection valves.

CROSS REFERENCE TO RELATED APPLICATIONS

This application is a continuing application of U.S. Ser. No. 937,658 entitled "Manufacturing Process for Manufacturing Thin Edge Orifice Disks For Fuel Injectors" filed on Dec. 4, 1986 by Grieb et al.

BACKGROUND OF INVENTION

Fuel injection systems for motor vehicles operate to provide accurate amounts of fuel to each cylinder in order to achieve a predetermined fuel/air ratio for purposes of combustion and operability of the engine. Most fuel injection systems are a combination of electronics and electromechanical devices. The responsibility of the electronics is to calculate the amount of fuel to be delivered to the cylinder and one of the electromechanical devices, the fuel injector, operates to deliver the calculated amount of fuel to the cylinder.

Most fuel injectors are actuated by a precise time length electrical pulse and during the actuation time, fuel is supplied from the injector. Both the opening time and the closing time of the injectors are controlled. Many factors influence the amount of fuel supplied by the injector. Some of these factors are the fuel pressure, the "lift" of the injector needle, the speed in which the injector valve opens and the speed in which the injector valve closes, the length of the actuation pulse, the size of the orifice or orifices through which the fuel flows, etc.

Depending on the type and style of fuel injector, there is a plate member between the valve seat and the end of the injector which directs the flow of fuel. Contained on this plate member is one or more orifices of precision size. Once the valve is opened for the predetermined period of time, the orifice or orifices control the amount of fuel actually discharged from the injector. Because of manufacturing techniques, the "cleanness" and the size of the orifices require each injector to be adjusted for the proper flow rates. This is a labor intensive task and therefore increases the cost of the injector.

Previous methods of manufacturing orifice disks have used Electrical Discharge Machines (EDM) for cutting the orifice by means of a controlled electrical discharge. Other methods have used laser beams, photo-etching, or basic drill and ream techniques to form the orifice. All of these, while they have been successful to some degree, it has not been without high unit cost.

Modern fuel injectors have no adjustments to be made after the injector is assembled and therefor the size of the orifice or orifices must be held to very close tolerances. This is typical of all orifices in every fuel injector and problems in flow rates are still present. To further solve the problem of maintaining desired flow rates, with all other factors in the fuel injector design remaining unaffected, the manufacturing apparatus and process for manufacturing an orifice disk for fuel injectors was developed.

SUMMARY OF INVENTION

A process for manufacturing a dual orifice disk for valves uses a progressive die means having several stations through which the disk stock is transported. The first two stations in the die means operate to punch the necessary pilot holes to hold the stock in the correct relationship to the orifice punch and to punch the approximate hole size of the first orifice.

The stock is progressed to a second station where the orifice is shaved of any extra material which is residual as a result of the punching. The next two stations are for punching and if necessary, shaving the second orifice. The following two succeeding stations contain coin punches which are controlled by micrometer adjusting means for first coinning one of the orifices and then coinning the other of the orifices. If desired, the coining process can be repeated for the backside of the disk for the two orifices.

The next stations in the progressive die operate to create the outside diameter pattern of the disk so the disk can be carried in the strip or as an option to remove the complete disk from the stock. Once the disk is removed from the stock, it is transported to the injector assembly and located between the valve seat and a back-up washer at the end of the injector. The micrometer adjusting means is controlled as a function of the final flow testing of the disk and operates to affect the coefficient of discharge of the orifice.

The orifice disk in the preferred embodiment is a thin disk having a dual orifices. The orifices are characterized as a thin edge orifices. The disk is fabricated from stainless steel to reduce or avoid contamination of the orifices with the liquid flowing therethrough. The orifices have the top edge coined to a predetermined dimension for maintaining the coefficient of discharge to achieve the desired fluid flow through the orifice disk.

It is a principal advantage and object of the invention to produce multiple burr free orifices in thin material stock. It is a further advantage of the invention to produce burr free orifices in a thin material disk stock in high volume production. It is yet another advantage of the invention to provide the manufacturing capability of adjusting the coining punch to maintain the required fluid flow quality of the orifices. It is another advantage of this invention is to be able to compensate for manufacturing variables, thus making this manufacturing process extremely economical. It is yet another advantage of this invention to produce valves having multi-stream flows of fluid from the valve. It is still another advantage to produce a single dual orifice disk for having two divergent fluid flows from a value wherein the disk has an embossment and each orifice is fully positioned on the sides of the embossment.

DESCRIPTION OF THE DRAWINGS

These and other advantages and objects will become apparent from the following detailed description taken in conjunction with the drawings in which:

FIG. 1 is a plan view of the orifice disk;

FIG. 2 is a partial sectional view of an injector illustrating the relationship of the orifice disk and the valve seat;

FIG. 3 is a graph of flow rate vs micrometer adjustment for the orifices manufactured according to the invention herein;

FIG. 4 is a plan view of the strip layout of the stock from which the disk is manufactured showing the several progressive steps;

DETAILED DESCRIPTION

Figure 5:
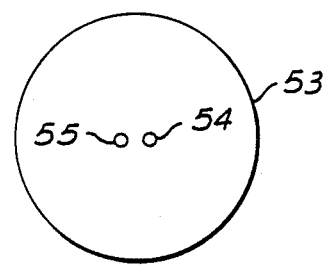
FIG. 5 is a plan view of an orifice disk having two orifices.

Referring to the FIGURES by the characters of reference, there is illustrated in FIG. 1 an orifice disk 10 as may be used in fuel injectors 12 or any other type of valve. The disk 10 is located between the valve seat 14 and the outlet 16 of the injector 12 and held in place by means of back-up washer 18 holding the disk 10 in spaced relationship with the end of the injector body 20 as illustrated in the sectional view of FIG. 2.

The injector 12 comprises a body having a fuel passageway 22 along the axis thereof. The body of the injector 12 is secured to a housing by means of the end of the housing being rolled over to hold the body tight against a spacer and a seal. The spacer is fabricated according to the method taught in U.S. Pat. No. 4,610,080 issued on Sept. 9, 1986, to T. E. Hensley entitled "Method For Controlling Fuel Injector Lift" and assigned to the assignee of this application. The housing contains an electromagnetic circuit for moving an armature member which is connected to a needle 24 to a pole piece. The axis of the pole piece has a fluid passageway in line with the fuel passageway 22 in the body 20, providing for the flow of fuel from an inlet to the valve seat 14. A spring means biases the armature member and the needle 24 into the valve seat 14 to close the injector 12.

The needle 24 of the injector 12 is controlled by means of an electromagnetic circuit, not shown, and is under the control of fuel injection pulse as may be generated from electronic circuitry including a microprocessor. When the injector 12 is closed, the needle 24 of the injector 12 is biased against the valve seat 14 to prevent any flow of liquid such as gasoline from the injector 12. The valve seat 14, as illustrated, has a conical section for mating with the needle 24 and an axial extending aperture 26. At the output of the aperture 26, the orifice disk 10 is located with the orifice 28 centered along the axis of the valve seat 14. As the liquid or fuel is discharged from the outlet 16 injector 12, the fuel fans out in a conical stream.

The characteristic of the flow rate depends in a large measure on the coefficient of discharge, $C_D$, of the orifice 28. This coefficient is the product of the coefficient of contraction $C_C$ and the coefficient of velocity $C_V$ according to the following formula:

$$C_D = (C_C)(C_V)$$

The higher the coefficient of discharge, the more the actual flow out of the orifice 28 is equal to the ideal flow out of the orifice 28. This equates to:

$$Q = (C_D)(Q_i)$$

where Q is the actual discharge flow and $Q_i$ is the ideal discharge flow.

The orifice disk 10 of FIGS. 1 and 2 is a thin stainless steel disk having an orifice 28 with a diameter of 0.0185 inches (0.4699 mm). In the preferred embodiment, the thickness of the disk 10 is 0.003 inches (0.0762 mm) and the main dimension or diameter of the disk 10 is 0.248 inches (6.32 mm) giving a ratio of thickness to the main dimension of 1:80. The length/diameter ratio of the orifices is less than 0.25. By means of the manufacturing apparatus to be described herein, the orifice 28 is punched with a known punch size and then coined within acceptable bounds to produce a desired thin edge orifice flow within a flow range without changing punch and die bushings.

FIG. 4 illustrates the plan view of the strip 30 layout of the stock from which the orifice disk 10 of FIG. 1 is fabricated. As will be described herein, the disk 10 may be manufactured in a progressive die and the view of FIG. 4 illustrates the results of several of the stations of a progressive die. The first station 34 illustrates a pair of pilot holes 32 punched through the stock. These pilot holes 32 are well outside the outside diameter of the finished disk 10 of FIG. 1 and function to locate and hold the strip 30 in the succeeding stations of the die to maintain the relationship between the orifice 28 and the outer perimeter of the disk 10.

The next station 36 illustrates the result of punching the orifice 28 in the strip 30 material. This is accomplished by means of a punch having its size held to very tight tolerances. After the orifice 28 is punched, the strip 30 moves to a succeeding station 38 where the orifice 28 is shaved, if necessary, of any extra material which is residual as a result of the punching operation. Next the strip 30 is moved to a station 40 where one of the surfaces of the orifice 28 is coined. In some instances it is advisable after coining the one surface to move the strip 30 to another station where the opposite surface of the orifice 28 is coined. As will be described, the coining is performed by means of a coining die controlled by a micrometer adjustment. In the following station 42, the outside diameter "hot dog" pattern 44 of the disk 10 is blanked and carried in strip 30. As an option, station 46 the disk 10 can be blanked from the strip 30 when making individual disks. The option to punch the "hot dog" pattern 44 and carry the disk in the trip or to blank the disk completely out of the strip 46 is dictated by whether or not the disk will be assembled into the valve body automatically or manually.

By means of the micrometer adjustment, the depth of the coining punch is controlled and the end result is the control of the flow of fuel from the orifice 28. FIG. 3 illustrates the relationship between the adjustment of the micrometer along the "x axis" 48 and the flow out of a thin edge orifice disk 10 fabricated in accordance with the process herein along the "y axis" 50. It is thus seen by the curve 52 that for a very small change in the adjustment of the micrometer, the flow changes in a linear manner. It has been found that after initial die run in, the necessity to adjust the coin punch is very infrequent as the thin edge orifice 28 size and characteristics remain constant for a fixed orifice flow other than compensating for the wear and material variation.

FIG. 5 illustrates an orifice disk 53 similar to the disk 10 illustrated in FIG. 1 with the sole exception of having at least two spaced apart orifices 54, 55. The two orifices 54, 55 are formed in the same manner as the orifice 28 in the disk 10 in FIG. 1; in that the orifices 54, 55 are punched in a station of a progressive die as stated for the orifice 28. After punching, the orifices may be coined in succeeding stations or the second of the two orifices may be punched after the first orifice is coined and then the second orifice is coined after it is punched. In the preferred embodiment, both orifices 54, 55 are punched and then both orifices are coined. A typical diameter of each orifice is 0.014 inches (0.3556 mm) and with a 0.003 inch (0.0762 mm) thick disk, the length/diameter ratio of each orifice is 0.21. If there is any extra material as a result of the punching operation, the orifices may be shaved before coining.

Figure 6:
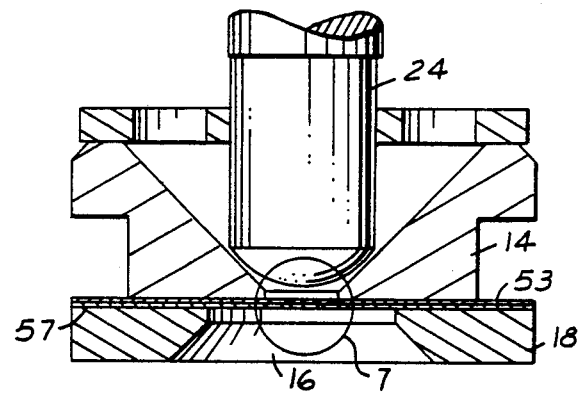
FIG. 6 is a partial sectional view of an valve illustrating the relationship of two dual orifice disks and the valve seat.
Figure 7:
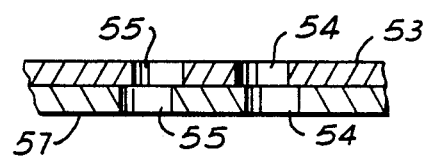
FIG. 7 is a enlarged view of the area of the circle in FIG. 6 showing the relationship of the two dual orifice disks.

FIG. 6 illustrates a partial sectional view of a valve having two dual orifice disks 53, 57 of FIG. 5. In FIG. 6, the two disks 53, 57 are positioned between the valve seat 14 and the backup washer 18 and function to direct the flow of the fluid through the valve output 16 into two divergent streams from the valve. As further illustrated in FIG. 7, the orifices 54, 55 in the two disks 53, 57 have a different axial spacing. The orifices 54, 55 in the top disk 53 are spaced closer together than in the bottom disk 57. In another embodiment, which is not illustrated, the two disks are identical to the disk 53 but when they are positioned in the valve, they are rotated slightly with respect to each other. In either embodiment, the flow through the top disk 53 orifices is further directed by the bottom disk 57 and the resultant is a divergent flow.

Figure 8:
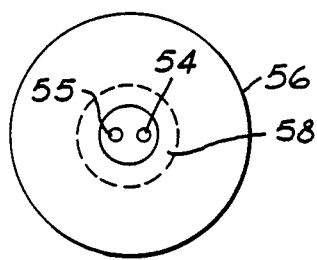
FIG. 8 is a plan view of an orifice disk having two orifices and an embossment.
Figure 9:
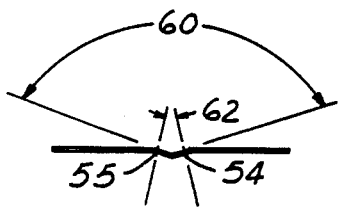
FIG. 9 is a section view of the orifice disk taken along line 9—9 of FIG. 8 showing the relationship between the orifices and the embossment.

FIGS. 8 and 9 illustrates an orifice disk 56 similar to that illustrated in FIG. 5 with the sole exception of an embossment 58 which in the preferred embodiment is concentric with the axis of the disk 56. The embossment 58, which may be any desired shape, is in the preferred embodiment conical in shape. The angle 60 of the apex of the conical shape has an angular value which is the complement of the angle 62 formed by the intersecting inside the valve of the axis of the two orifices 54, 55. In the preferred embodiment this angle is substantially 156°.

The embossment 58 is formed in the progressive die either before or after the coining operation. The embossment is of such a depth that both orifices are positioned along the sides of the embossment between the base and the apex thereof.

Figure 10:
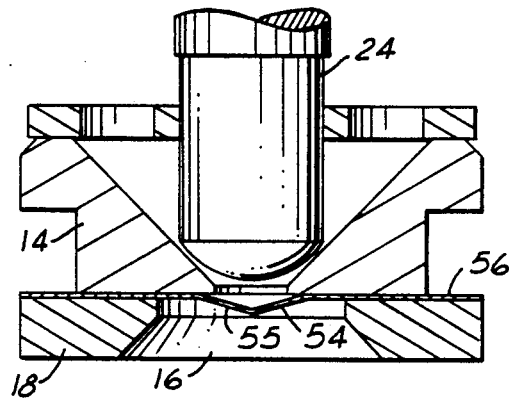
FIG. 10 is a partial sectional view of an valve illustrating the relationship of the dual orifice disk and the valve seat.

FIG. 10 is a partial sectional view of a valve having two dual orifice disk 56 of FIG. 8. In FIG. 10, the dual orifice disk 56 is positioned between the valve seat 14 and the backup washer 18 and functions to direct the flow of the fluid through the valve output 16 into two divergent streams from the valve.

It is to be understood that in either embodiment illustrated in FIG. 6 or 10, orientation of the disk in the valve may be critical and a means of indexing the location of the orifices to an external location on the valve will be used. If it is an electromechanical valve, the orientation may be relative to the connection for the wires. Another form of orientation maybe to a special surface on the external surface of the valve.

Many changes and modifications in the above described embodiment of the invention can, of course, be carried out without departing from the scope thereof. Accordingly, that scope is intended to be limited only by the scope of the appended claims.

We claim:
1. In a valve for controlling the flow of a fluid having a valve body with a fluid passageway therein terminating in an outlet, a valve seat in the fluid passageway, a valve needle biased to seat on the valve seat to close the passageway, a backup washer between the valve seat and the outlet, the improvement comprising:
   a first thin disk member having a dual orifices therein said first member positioned adjacent the valve seat;
   a second thin disk member having a dual orifices therein said second member positioned between said first member and the backup washer;
   wherein the dual orifices of said first member partially overlap said dual orifices of said second member for directing the flow of fluid from valve in a dual stream whereby said dual streams are not parallel.
2. In a valve according to claim 1 wherein said orifices therein have a length/diameter ratio less than 0.25.
3. In a valve according to claim 1 wherein said dual orifices of said first member are spaced closer together than said dual orifices of said second member and partially overlap said dual orifices of said second member for directing the flow of fluid from valve in a dual stream whereby said dual streams are divergent.

* * * * *

UNITED STATES PATENT AND TRADEMARK OFFICE
CERTIFICATE OF CORRECTION

PATENT NO. : 4,923,169

DATED : May 8, 1990

INVENTOR(S) : Grieb et al

It is certified that error appears in the above-identified patent and that said Letters Patent is hereby corrected as shown below:

On the title page, under item [19], "Grieb et al." should read --Weaver et al.-- and item [75], "John H. Grieb; J. Michael Joseph, both of Newport News; Richard D. Weaver, Williamsburg; George T. Bata, Grafton, all of Va."

should read

--Richard D. Weaver, Williamsburg; George T. Bata, Grafton, both of Va.--.

Signed and Sealed this

Eleventh Day of December, 1990

Attest:

HARRY F. MANBECK, JR.

*Attesting Officer*  *Commissioner of Patents and Trademarks*